United States Patent [19]

Tannas, Jr.

[11] Patent Number: 5,077,704
[45] Date of Patent: Dec. 31, 1991

[54] 3-D SONAR IMAGE DISPLAY
[75] Inventor: Lawrence E. Tannas, Jr., Orange, Calif.
[73] Assignee: Rockwell International Corporation, El Segundo, Calif.
[21] Appl. No.: 628,973
[22] Filed: Dec. 17, 1990
[51] Int. Cl.⁵ ............................................. G01S 3/80
[52] U.S. Cl. ..................................................... 367/123
[58] Field of Search ................ 367/8, 910, 7, 11, 123

[56] References Cited
U.S. PATENT DOCUMENTS

| | | | |
|---|---|---|---|
| 3,400,363 | 9/1968 | Silverman | 367/8 |
| 3,756,683 | 9/1974 | Smith, Jr. | 367/8 |
| 4,557,386 | 12/1985 | Buckley et al. | 367/8 |
| 4,667,199 | 5/1987 | Roberts | 342/169 |
| 4,758,999 | 7/1988 | Marwood et al. | 367/121 |
| 4,768,156 | 8/1988 | Whitehouse et al. | 364/521 |
| 4,805,015 | 4/1989 | Copeland | 364/521 |
| 4,807,165 | 2/1989 | Becker | 367/124 |
| 4,899,318 | 2/1990 | Schlumberger et al. | 367/8 |

Primary Examiner—Daniel T. Pihulic
Attorney, Agent, or Firm—H. Fredrick Hamann; George A. Montanye; Tom Streeter

[57] ABSTRACT

A 3-D sonar image display takes two sonar signals from the same event, slightly displaced from one another in time, space, or both. Each signal is converted from audio to video, and is presented to a separate eye of the sonar operator. The coherent parts of the signal—those actually produced by the event—will be fused by the optical portions of the brain into a three-dimensional image. The noise portions of the signal will not be coherent, and will not produce a three-dimensional image.

12 Claims, 3 Drawing Sheets

3-D SONAR IMAGE DISPLAY

BACKGROUND OF THE INVENTION

Sonar is not merely the art and science of detecting the existence of a sound in the sea; it is also the art and science of extracting the signal from the background noise, and of deducing from the signal the nature of its source. Considerable work has been done in automated signal extraction and categorization but, in the last analysis, the trained sonar operator is still the best signal extractor and categorizer. The signal must therefore be presented to the sonar operator in the best possible light. The prior art has not yet done this.

SUMMARY OF THE INVENTION

The general concept of this invention is to take two sonar signals from the same event, slightly displaced from one another in time, space, or both. Each signal is converted from audio to video, and is presented to a separate eye of the sonar operator. The coherent parts of the signal—those actually produced by the event—will be fused by the optical portions of the brain into a three-dimensional image. The noise portions of the signal will not be coherent, and will not produce a three-dimensional image.

DETAILED DESCRIPTION OF A PREFERRED EMBODIMENT

Figure 1:
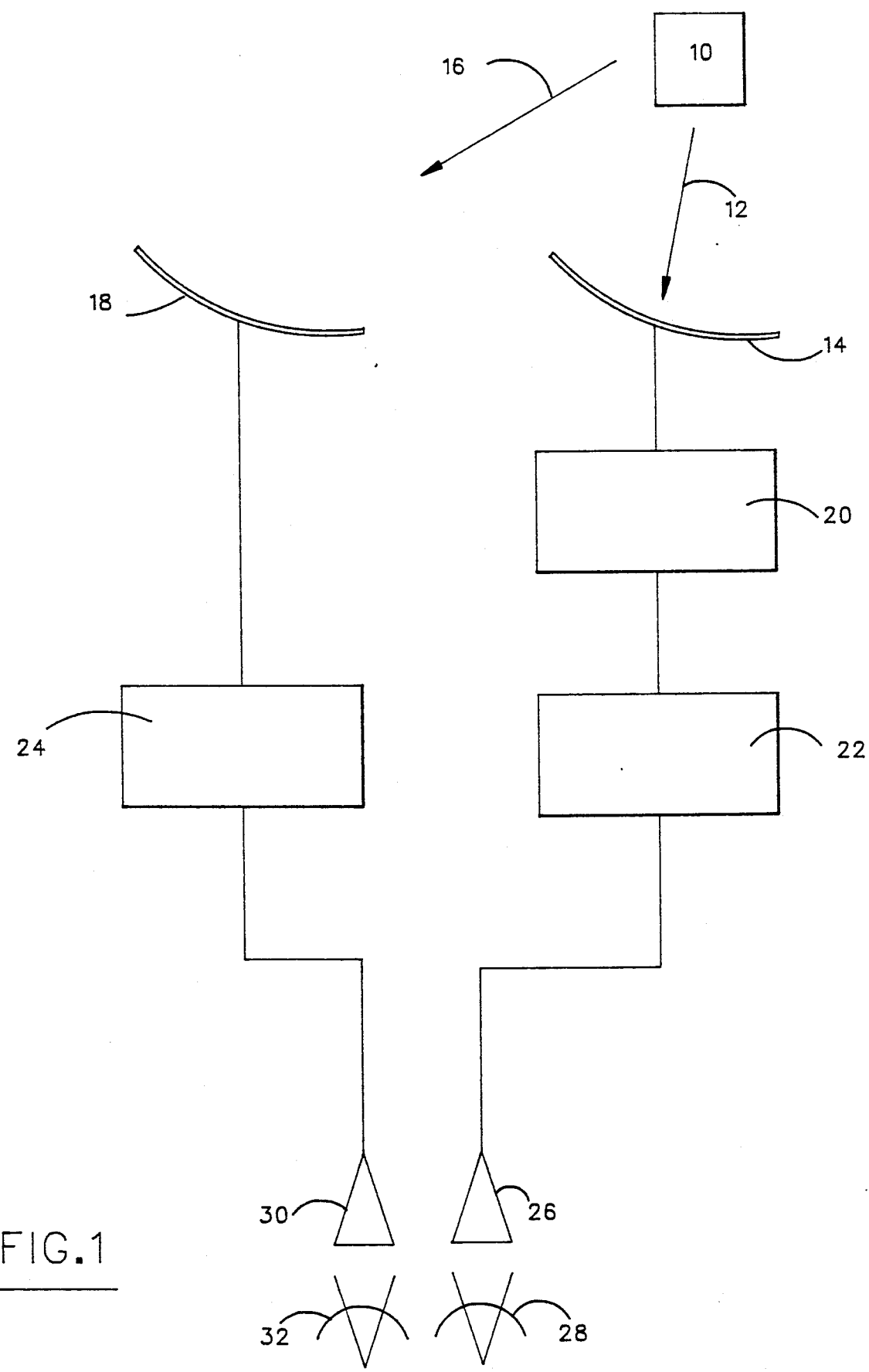
FIG. 1 is a block diagram of a spatiotemporal version of the present invention.

In FIG. 1, a sound source 10 produces a first sound wave 12 which is detected by first hydrophone 14 where it is converted into an electrical signal, and a second sound wave 16 which is detected by a second hydrophone 18, which is generally of a construction identical to that of the first hydrophone 14. The signal from the first hydrophone 14 is passed through a delay apparatus 20 and thence to a first signal processor 22, while the signal from the second hydrophone 18 is passed directly to a second signal processor 24, which, again, is generally of identical construction to the first signal processor 22. The first signal processor 22 produces a signal to be displayed on a first display (typically a cathode ray tube) 26, where it is seen by a first eye 28 of a sonar operator, while the second signal processor 24 produces a signal to be displayed on a second display (likewise constructed) 30, where it is seen by a second eye 32 of the sonar operator.

Figure 2:
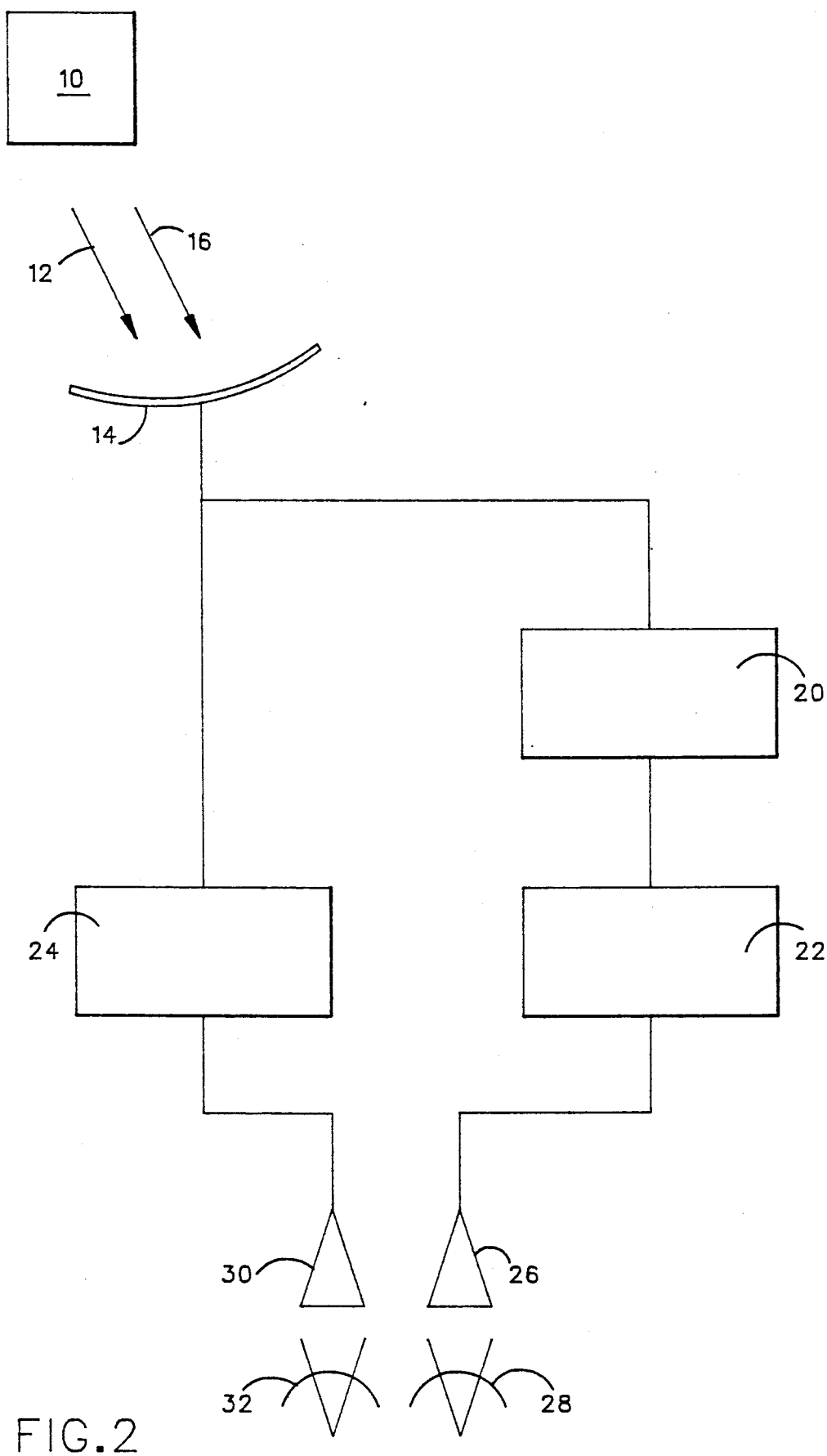
FIG. 2 is a block diagram of a purely temporal version of the present invention.

FIG. 2 shows the present invention when only a single hydrophone 14 is available. Here the delay apparatus 20 causes the first sound wave 12 not to be processed and displayed to first eye 28 until a second sound wave 16, received at the same hydrophone 14 but at a later time, is processed and displayed to second eye 32. This version of the present invention is suited to sounds which propagate fairly uniformly in space, but have later temporal characteristics which follow fairly predictably from their earlier characteristics.

In both FIG. 1 and FIG. 2, the delay apparatus 20 is shown as delaying the signal between the hydrophone 14 and signal processor 22. It is apparent that the delay apparatus 20 could equally well delay the signal between the processor 22 and the display 26, or could even be incorporated into the first signal processor 22 (although not, of course, into the second signal processor 24, which would otherwise remain identical to the first signal processor 22).

Figure 3:
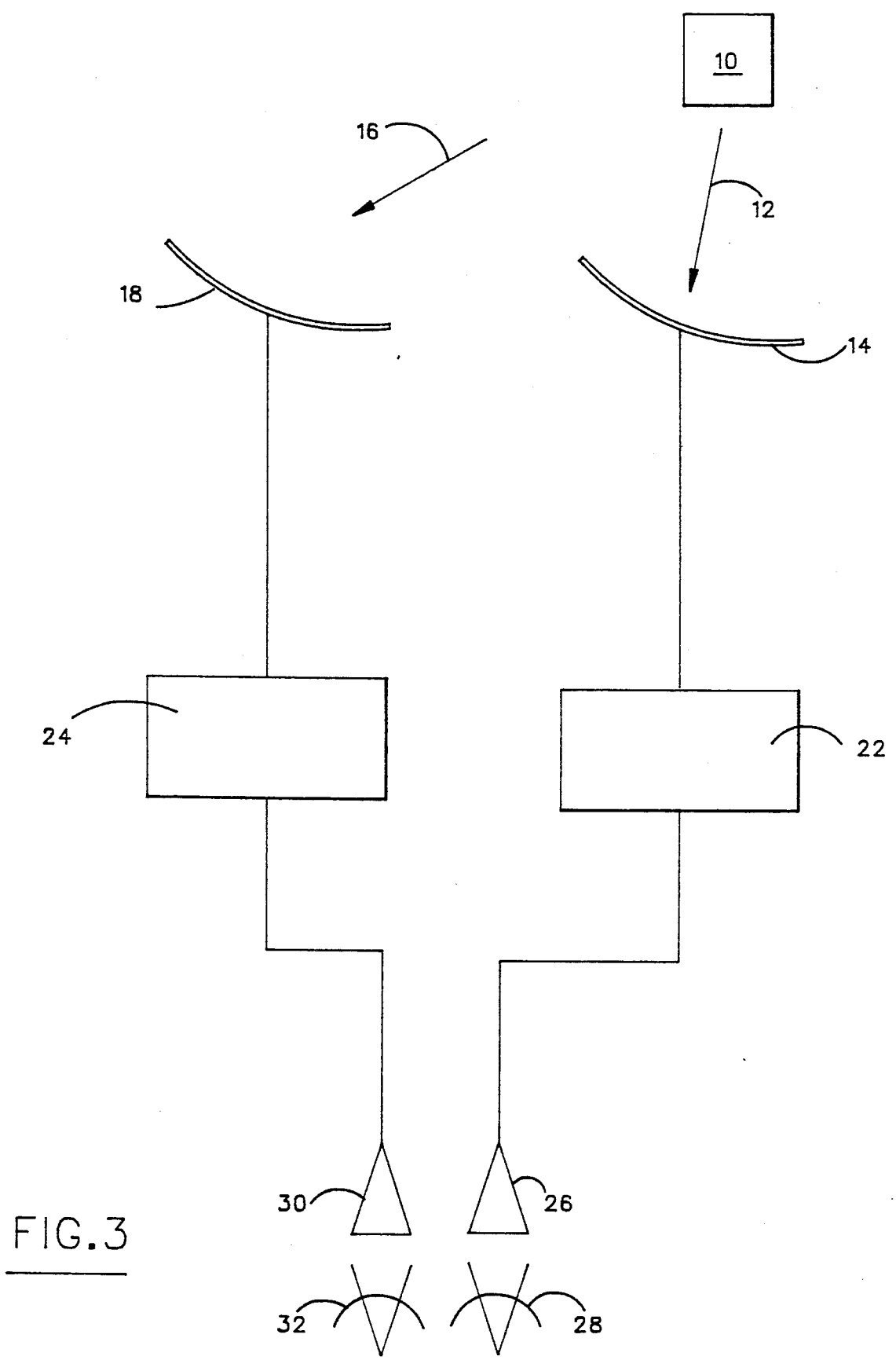
FIG. 3 is a block diagram of a purely spatial version of the present invention.

FIG. 3 shows the present invention when both hydrophones 14 and 18 are available, but the delay apparatus 20 is not. This version of the present invention is suitable when the spatial variations of the sound waves 12 and 16 predominate over their temporal variations. Of course, to the extent that (as shown) one hydrophone 14 is closer to the source 10 than is the other hydrophone 18, the finite speed of sound in water causes spatial variations to be detected as temporal variations.

INDUSTRIAL APPLICABILITY

The present invention is capable of exploitation in industry, and can be used, whenever it is desired to separate a sonar signal from background noise. It can be made from components which, taken in isolation from one another, are entirely conventional, or it can be made from their non-conventional counterparts.

While a particular embodiment of the present invention has been described in detail herein, the invention is not limited thereto, but has a true scope and spirit limited only by the following claims.

What is claimed is:

1. A method for categorizing the nature of a source of sound, comprising:
   (a) detecting a first sound from the source;
   (b) detecting a second sound from the source;
   (c) converting the first sound to a first image;
   (d) converting the second sound to a second image;
   (e) displaying the first image to a first eye of a sonar operator; and
   (f) displaying the second image to a second eye of the sonar operator.

2. The method of claim 1, wherein the step of converting the first sound to the first image comprises the step of delaying a signal representing the sound.

3. The method of claim 1, wherein the step of detecting the first sound and the step of detecting the second sound take place at different locations.

4. The method of claim 3, wherein the step of converting the first sound to the first image comprises the step of delaying a signal representing the sound.

5. Apparatus for categorizing the nature of a source of sound, comprising:
   (a) means for detecting a first sound from the source;
   (b) means for detecting a second sound from the source;
   (c) means for converting the first sound to a first image;
   (d) means for converting the second sound to a second image;
   (e) means for displaying the first image to a first eye of a sonar operator; and
   (f) means for displaying the second image to a second eye of the sonar operator.

6. The apparatus of claim 5, wherein the means for converting the first sound to the first image comprises means for delaying a signal representing the sound.

7. The apparatus of claim 5, wherein the means for detecting the first sound and the means for detecting the second sound are situated at different locations.

8. The apparatus of claim 7, wherein the means for converting the first sound to the first image comprises means for delaying a signal representing the sound.

9. A method for displaying a 3-D sonar image, comprising:
   (a) detecting a first sound;
   (b) detecting a second sound;
   (c) converting the first sound to a signal representing the first sound;
   (d) delaying the signal;
   (e) converting the delayed signal to a first image;
   (f) converting the second sound to a second image;
   (g) displaying the first image to a first eye of a sonar operator; and
   (h) displaying the second image to a second eye of the sonar operator.

10. The method of claim 9, wherein the step of detecting the first sound and the step of detecting the second sound take place at different locations.

11. Apparatus for displaying a 3-D sonar image, comprising:
    (a) means for detecting a first sound;
    (b) means for detecting a second sound;
    (c) means for converting the first sound to a signal representing the first sound;
    (d) means for delaying the signal;
    (e) means for converting the delayed signal to a first image;
    (f) means for converting the second sound to a second image;
    (g) means for displaying the first image to a first eye of a sonar operator; and
    (h) means for displaying the second image to a second eye of the sonar operator.

12. The apparatus of claim 10, wherein the means for detecting the first sound and the means for detecting the second sound are situated at different locations.

* * * * *